United States Patent
Seo et al.

(10) Patent No.: US 9,137,736 B2
(45) Date of Patent: Sep. 15, 2015

(54) METHOD OF TRANSMITTING AND RECEIVING CHANNEL BANDWIDTH INFORMATION IN A WIRELESS COMMUNICATION SYSTEM

(75) Inventors: In Kwon Seo, Anyang-si (KR); Joon Kui Ahn, Anyang-si (KR); In Jae Jung, Anyang-si (KR); Sang Wook Lee, Anyang-si (KR); Su Hwan Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 553 days.

(21) Appl. No.: 13/383,735

(22) PCT Filed: Jul. 13, 2010

(86) PCT No.: PCT/KR2010/004530
§ 371 (c)(1),
(2), (4) Date: Jan. 12, 2012

(87) PCT Pub. No.: WO2011/007997
PCT Pub. Date: Jan. 20, 2011

(65) Prior Publication Data
US 2012/0106499 A1    May 3, 2012

Related U.S. Application Data

(60) Provisional application No. 61/226,291, filed on Jul. 17, 2009.

(30) Foreign Application Priority Data

Sep. 2, 2009   (KR) .................... 10-2009-0082459

(51) Int. Cl.
*H04W 4/00*    (2009.01)
*H04W 48/08*    (2009.01)
(Continued)

(52) U.S. Cl.
CPC .............. *H04W 48/08* (2013.01); *H04W 48/16* (2013.01); *H04W 72/00* (2013.01)

(58) Field of Classification Search
CPC .......... H04J 11/0093; H04W 36/0083; H04W 72/1289; H04L 5/0007; H04L 5/0091; H04L 5/0053
USPC ................................................. 370/328–352
See application file for complete search history.

(56) References Cited

U.S. PATENT DOCUMENTS 7,940,740 B2 *   5/2011   Krishnamurthy et al. .... 370/344
8,041,353 B2 *  10/2011   Kazmi et al. .................. 455/434

(Continued)

FOREIGN PATENT DOCUMENTS

| KR | 10-2008-0109535 A | 12/2008 |
|---|---|---|
| KR | 10-2009-0067009 A | 6/2009 |
| WO | WO 2007/149961 A1 | 12/2007 |

*Primary Examiner* — Nicholas Sloms
(74) *Attorney, Agent, or Firm* — Birch, Stewart, Kolasch & Birch, LLP (57) ABSTRACT

A method for transmitting and receiving signals in a wireless communication system supporting a carrier aggregation of a plurality of component carriers is described. A base station transmits first information indicating a maximum number of resource blocks available for a first type mobile station, and transmits second information indicating an extended number of resource blocks available for a second type mobile station. The first type mobile station does not support the carrier aggregation and the second type mobile station supports the carrier aggregation. The extended number of resource blocks include at least one resource block allocated between each component carrier and a guard band. A mobile station receives the first and second information.

20 Claims, 4 Drawing Sheets

(51) Int. Cl.
*H04W 48/16* (2009.01)
*H04W 72/00* (2009.01)

(56) References Cited

U.S. PATENT DOCUMENTS

| | | | |
|---|---|---|---|
| 8,340,676 B2 * | 12/2012 | Nory et al. | 455/450 |
| 8,483,107 B2 * | 7/2013 | Ahn et al. | 370/280 |
| 8,526,933 B2 * | 9/2013 | Baldemair et al. | 455/418 |
| 8,542,605 B2 * | 9/2013 | Chen et al. | 370/252 |
| 8,588,155 B2 * | 11/2013 | Lee et al. | 370/329 |
| 8,611,277 B2 * | 12/2013 | Krishnamurthy et al. | 370/328 |
| 8,711,721 B2 * | 4/2014 | Smith et al. | 370/252 |
| 8,780,784 B2 * | 7/2014 | Chung et al. | 370/315 |
| 2009/0175372 A1 | 7/2009 | Moon et al. | |
| 2009/0319903 A1 * | 12/2009 | Alanara | 715/733 |
| 2010/0068993 A1 * | 3/2010 | Khan | 455/12.1 |
| 2010/0105380 A1 * | 4/2010 | Attar et al. | 455/434 |
| 2010/0177831 A1 | 7/2010 | Kim et al. | |
| 2010/0195566 A1 * | 8/2010 | Krishnamurthy et al. | 370/328 |
| 2010/0202382 A1 * | 8/2010 | Park et al. | 370/329 |
| 2010/0272037 A1 * | 10/2010 | Lee et al. | 370/329 |
| 2010/0323693 A1 * | 12/2010 | Krishnamurthy et al. | 455/434 |
| 2010/0331030 A1 * | 12/2010 | Nory et al. | 455/509 |
| 2011/0007673 A1 * | 1/2011 | Ahn et al. | 370/280 |
| 2011/0081913 A1 * | 4/2011 | Lee et al. | 455/450 |
| 2011/0188427 A1 * | 8/2011 | Ishii | 370/311 |
| 2011/0205995 A1 * | 8/2011 | Grovlen | 370/329 |
| 2011/0305211 A1 * | 12/2011 | Lunttila et al. | 370/329 |
| 2012/0014332 A1 * | 1/2012 | Smith et al. | 370/329 |
| 2012/0033571 A1 * | 2/2012 | Shimezawa et al. | 370/252 |
| 2012/0069793 A1 * | 3/2012 | Chung et al. | 370/315 |
| 2012/0100844 A1 * | 4/2012 | Baldemair et al. | 455/418 |
| 2012/0106499 A1 * | 5/2012 | Seo et al. | 370/329 |
| 2012/0263047 A1 * | 10/2012 | Love et al. | 370/252 |
| 2012/0263117 A1 * | 10/2012 | Love et al. | 370/329 |
| 2012/0263118 A1 * | 10/2012 | Love et al. | 370/329 |
| 2012/0275409 A1 * | 11/2012 | Han et al. | 370/329 |
| 2013/0176952 A1 * | 7/2013 | Shin et al. | 370/329 |
| 2013/0223400 A1 * | 8/2013 | Seo et al. | 370/329 |
| 2013/0230013 A1 * | 9/2013 | Seo et al. | 370/329 |

* cited by examiner

MasterInformationBlock

```
--ASN1START
MasterInformationBlock ::=        SEQUENCE {
    dl-Bandwidth                  ENUMERATED {
                                      n6, n15, n25, n50, n75, n100}
    phich-Config                  PHICH-Config,
    systemFrameNumber             BIT STRING ( SIZE (8)),
    spare                         BIT STRING ( SIZE (10))
}

--ASN1STOP
```

METHOD OF TRANSMITTING AND RECEIVING CHANNEL BANDWIDTH INFORMATION IN A WIRELESS COMMUNICATION SYSTEM

CROSS REFERENCE TO RELATED APPLICATIONS

This application is the National Phase of PCT/KR2010/004530 filed on Jul. 13, 2010, which claims priority under 35 U.S.C. 119(e) to U.S. Provisional Application No. 61/226,291 filed on Jul. 17, 2009 and under 35 U.S.C. 119(a) to Patent Application No. 10-2009-0082459 filed in Republic of Korea on Sep. 2, 2009, all of which are hereby expressly incorporated by reference into the present application.

TECHNICAL FIELD

The present invention relates to a wireless mobile communication system, and more particularly, to a method of transmitting and receiving channel bandwidth information in a wireless communication system.

BACKGROUND ART

Generally, a currently ongoing LTE-A system supports carrier aggregation (CA) as a means for increasing spectrum efficiency and throughput. In this carrier aggregation, a bandwidth is extended by aggregating a plurality of carriers to raise a data rate.

Multicarrier indicates the whole frequency bands used by a base station. And, a component carrier means an element carrier that constructs the multicarrier. In particular, a plurality of component carriers construct the multicarrier via the carrier aggregation.

In a general frequency division duplex (FDD) wireless communication system, data transceiving is performed via one downlink band and one corresponding uplink band. In the carrier aggregation applied wireless communication, a bandwidth is configured by aggregating a plurality of component carriers to support large and various uplink/downlink bandwidths. For instance, in LTE-A system, 5 component carriers of maximum bandwidth 20 MHz are aggregated to support uplink/downlink (UL/DL) bandwidth of 100 MHz.

Regarding the carrier aggregation (hereinafter abbreviated CA), there are continuous CA and non-continuous CA. In the continuous CA, component carriers continuously exist on a frequency axis. In the non-continuous CA, component carriers discontinuously exist on a frequency axis by being spaced apart from each other.

Figure 1:
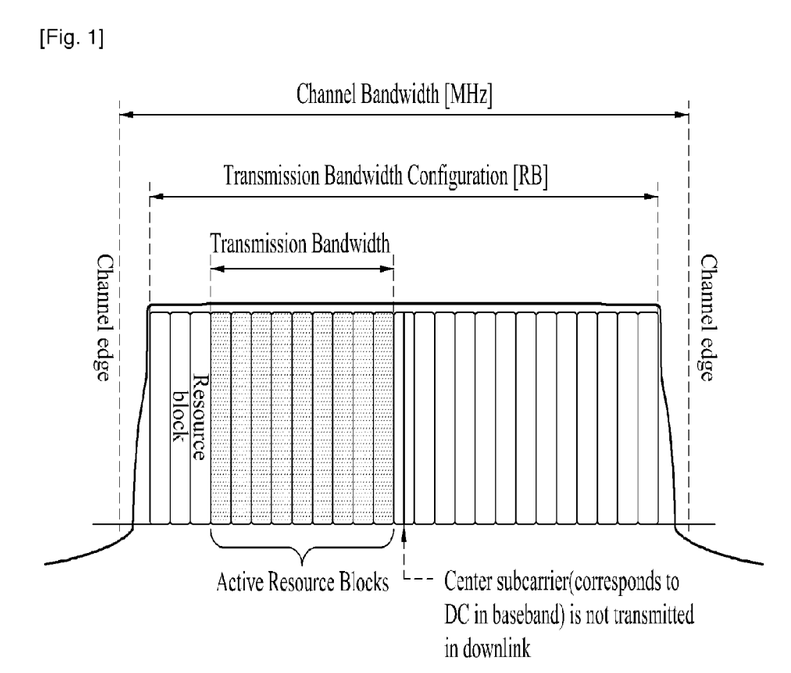
FIG. 1 is a diagram for transmission bandwidth configuration of LTE system.

In the following description, a method of transmitting channel bandwidth information according to a related art is explained. FIG. 1 is a diagram for transmission bandwidth configuration of LTE system.

First of all, in the LTE system, a system bandwidth supports 1.25 MHz up to maximum 20 MHz. In case that the system bandwidth is 20 MHz, the number of maximum available resource blocks (RB) is 100 in consideration of interference between adjacent channels, transmission power leakage to an adjacent band and the like.

Referring to FIG. 1, if a channel bandwidth is 20 MHz, a transmission block configuration includes 100 resource blocks. And, active resource blocks means the resource blocks actually used by a mobile station among available resource blocks.

In the LTE system, a base station indicates a downlink channel bandwidth as the number of maximum available resource blocks via master information block (hereinafter abbreviated MIB) of PBCH.

Figure 2:
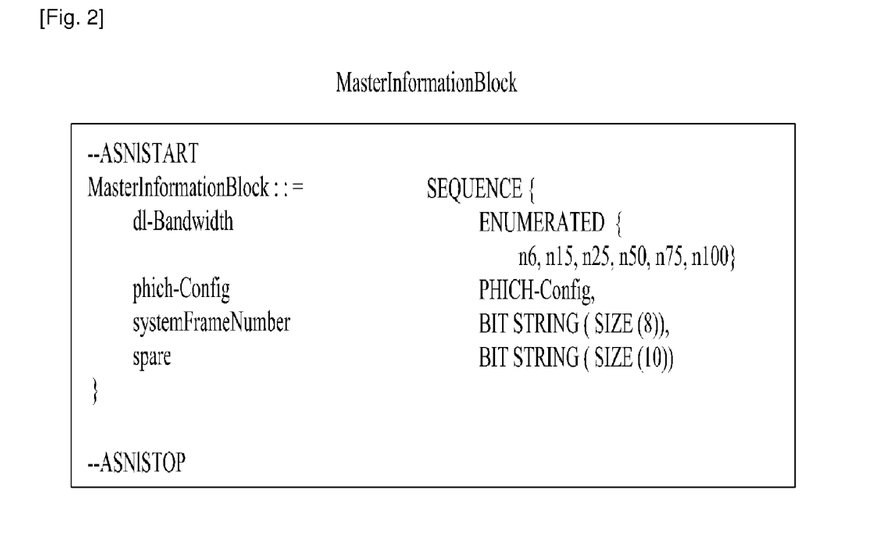
FIG. 2 is a diagram of a master information block according to a related art.

FIG. 2 is a diagram of a master information block according to a related art.

Referring to FIG. 2, a variable d1-bandwidth indicates a channel bandwidth and the d1-bandwidth can be set to a value corresponding to one of n6, n15, n25, n50, n75 and n100. In the LTE system, if a system bandwidth is 1.4 MHz, the number of maximum available resource blocks is 6. If a system bandwidth is 3 MHz, the number of maximum available resource blocks is 15. If a system bandwidth is 5 MHz, the number of maximum available resource blocks is 25. If a system bandwidth is 10 MHz, the number of maximum available resource blocks is 50. If a system bandwidth is 15 MHz, the number of maximum available resource blocks is 75. If a system bandwidth is 20 MHz, the number of maximum available resource blocks is 100. Hence, according to a related art, a base station is able to indicate a channel bandwidth by informing a mobile station of the number of available resource blocks.

In case that the LTE-A system uses the continuous carrier aggregation, it is able to reduce a band unused between a guard interval belonging to a component carrier and the component carrier. When each of the component carriers has a bandwidth of 20 MHz, 108 resource blocks for each of the component carriers are usable for data transmission.

Therefore, n108 should be added as a value available for the d1-bandwidth. Yet, if the value available for the d1-bandwidth is increased, it causes a problem that backward compatibility is not maintained. In particular, on condition that: the continuous carrier aggregation is applied; a bandwidth of the component carrier is 20 MHz; and the LTE mobile station and the LTE-A mobile station coexist in the same cell, if a base station transmits n108 as a value of the d1-bandwidth, the LTE mobile station is unable to interpret the value. If the base station transmits n100 as a value of the d1-bandwidth, the LTE-A mobile station is unable to use 8 resource blocks.

DISCLOSURE OF INVENTION

Technical Problem

As mentioned in the foregoing description of the related art, as the number of available resource blocks of a single channel is added according to carrier aggregation, it is unable to maintain the backward compatibility of the channel bandwidth information transmitting method.

Solution to Problem

Accordingly, the present invention is directed to a method of transmitting and receiving channel bandwidth information in a wireless communication system that substantially obviates one or more of the problems due to limitations and disadvantages of the related art.

An object of the present invention is to provide a method of transmitting and receiving channel bandwidth information in a wireless communication system, by which backward compatibility can be maintained.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting channel bandwidth information, which is transmitted by a base station in a wireless communication system supporting a first system and a second system, includes the steps of transmitting the channel bandwidth information including information on a maximum number of resource blocks available for a mobile station supporting the first system and transmitting information on a number of resource blocks available for a mobile station supporting the second system.

Preferably, the information on the number of the resource blocks available for the second system supporting mobile station includes the information on the resource blocks available for the second system supporting mobile station in addition to the resource blocks available for the first system supporting mobile station.

More preferably, the step of transmitting the information on the number of the resource blocks available for the second system supporting mobile station includes the steps of adding a field to a system information block (hereinafter abbreviated SIB) carried on a physical downlink shared channel (hereinafter abbreviated PDSCH) and transmitting the information on the number of the resource blocks available for the second system supporting mobile station via the added field.

More preferably, the step of transmitting the information on the number of the resource blocks available for the second system supporting mobile station includes the steps of adding a field to a master information block (hereinafter abbreviated MIB) carried on a physical broadcast channel (hereinafter abbreviated PBCH) and transmitting the information on the number of the resource blocks available for the second system supporting mobile station via the added field.

Preferably, in the information on the number of the resource blocks available for the second system supporting mobile station, the number of the resource blocks available for the second system supporting mobile station is represented as an index.

To further achieve these and other advantages and in accordance with the purpose of the present invention, a method of receiving channel bandwidth information, which is received by a mobile station in a wireless communication system supporting a first system and a second system, includes the steps of receiving the channel bandwidth information including information on a maximum number of resource blocks available for a mobile station supporting the first system and transmitting information on a number of resource blocks available for a mobile station supporting the second system.

Preferably, the information on the number of the resource blocks available for the second system supporting mobile station includes the information on the resource blocks available for the second system supporting mobile station in addition to the resource blocks available for the first system supporting mobile station.

More preferably, the method further includes the steps of obtaining a number of resource blocks available for the mobile station using the information on the maximum number of the resource blocks available for the mobile station supporting the first system and the information on the number of the resource blocks available for the mobile station supporting the second system and transceiving data with the base station using the resource blocks corresponding to the obtained number of the resource blocks.

More preferably, the step of receiving the information on the number of the resource blocks available for the second system supporting mobile station includes the step of receiving the information on the number of the resource blocks available for the second system supporting mobile station via a system information block (hereinafter abbreviated SIB) carried on a physical downlink shared channel (hereinafter abbreviated PDSCH).

More preferably, the step of receiving the information on the number of the resource blocks available for the second system supporting mobile station includes the step of receiving the information on the number of the resource blocks available for the second system supporting mobile station via a master information block (hereinafter abbreviated MIB) carried on a physical broadcast channel (hereinafter abbreviated PBCH).

To further achieve these and other advantages and in accordance with the purpose of the present invention, a base station in a wireless communication system supporting a first system and a second system includes a processor generating information on a maximum number of resource blocks available for a mobile station supporting the first system and information on a number of resource blocks available for a mobile station supporting the second system and a transmitting module transmitting the information on the maximum number of the resource blocks available for the mobile station supporting the first system and the information on the number of the resource blocks available for the mobile station supporting the second system.

To further achieve these and other advantages and in accordance with the purpose of the present invention, a mobile station in a wireless communication system supporting a first system and a second system includes a receiving module receiving information on a maximum number of resource blocks available for a mobile station supporting the first system and information on a number of resource blocks available for a mobile station supporting the second system and a processor obtaining a number of resource blocks available for the mobile station using the information on the maximum number of the resource blocks available for the mobile station supporting the first system and the information on the number of the resource blocks available for the mobile station supporting the second system.

It is to be understood that both the foregoing general description and the following detailed description are exemplary and explanatory and are intended to provide further explanation of the invention as claimed.

Advantageous Effects of Invention

According to embodiments of the present invention, additional information is transmitted using a new field by maintaining a channel bandwidth information transmission specification of the related art. Therefore, the present invention is able to maintain backward compatibility in an environment in which a mobile station supporting a legacy system and a mobile station supporting a new system coexist.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made centering on predetermined terminologies, they need not to be limited to the terminologies. If the following descriptions are made using random terminologies, the same meanings can be provided. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection. Moreover, such a terminology as '~part' '~functionality', '~module' and the like means a unit for handling at least one function or operation, which can be implemented by software, hardware or combination thereof.

First of all, a continuous carrier aggregation according to an embodiment of the present invention is described with reference to FIG. 3.

Figure 3:
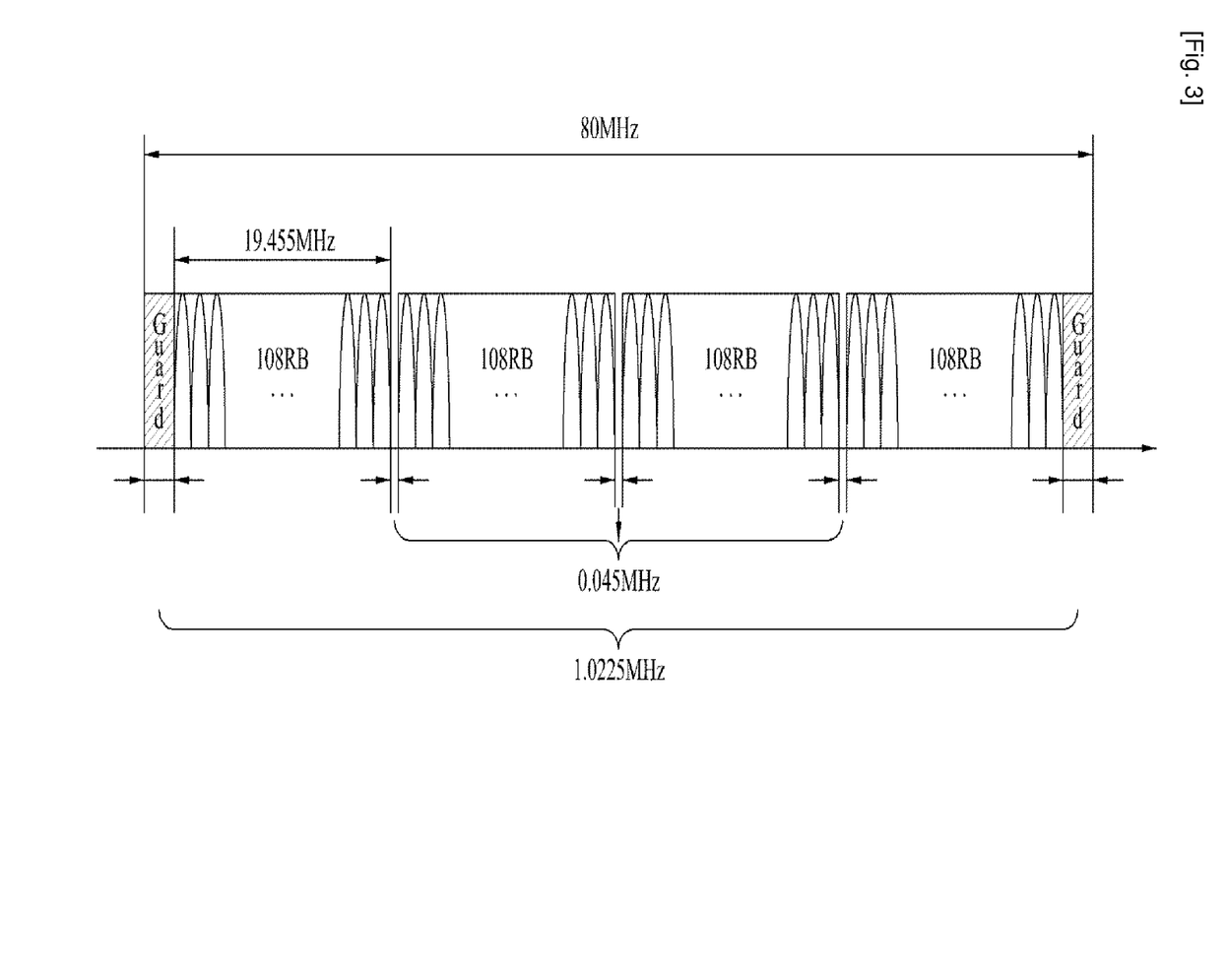
FIG. 3 is a diagram of an example for continuous carrier aggregation according to an embodiment of the present invention.

FIG. 3 is a diagram of an example for continuous carrier aggregation according to an embodiment of the present invention.

Referring to FIG. 3, if a carrier aggregation is configured by aggregating continuous component carriers, it is able to reduce a band unused between a guard interval of a component carrier and the component carrier. Hence, the number of available resource blocks of each of the component carriers is increased. For instance, in a related art LTE system, the number of available resource blocks of 20 MHz bandwidth is 100. In LTE-A system, in case of using a continuous carrier aggregation, the number of available resource blocks of 20 MHz bandwidth can become 108.

In the following description, a method of transmitting channel bandwidth information according to an embodiment of the present invention is described with reference to FIG. 4.

First of all, a wireless communication system according to an embodiment of the present invention supports both a legacy system and a new system and also supports a carrier aggregation. For instance, a wireless communication system according to an embodiment of the present invention supports both LTE system and LTE-A system.

Therefore, according to an embodiment of the present invention, a base station transmits a master information block (hereinafter abbreviated MIB) including a d1-bandwidth field according to the specification of a legacy system and also transmits the number of extended resource blocks via an additional field.

Figure 4:
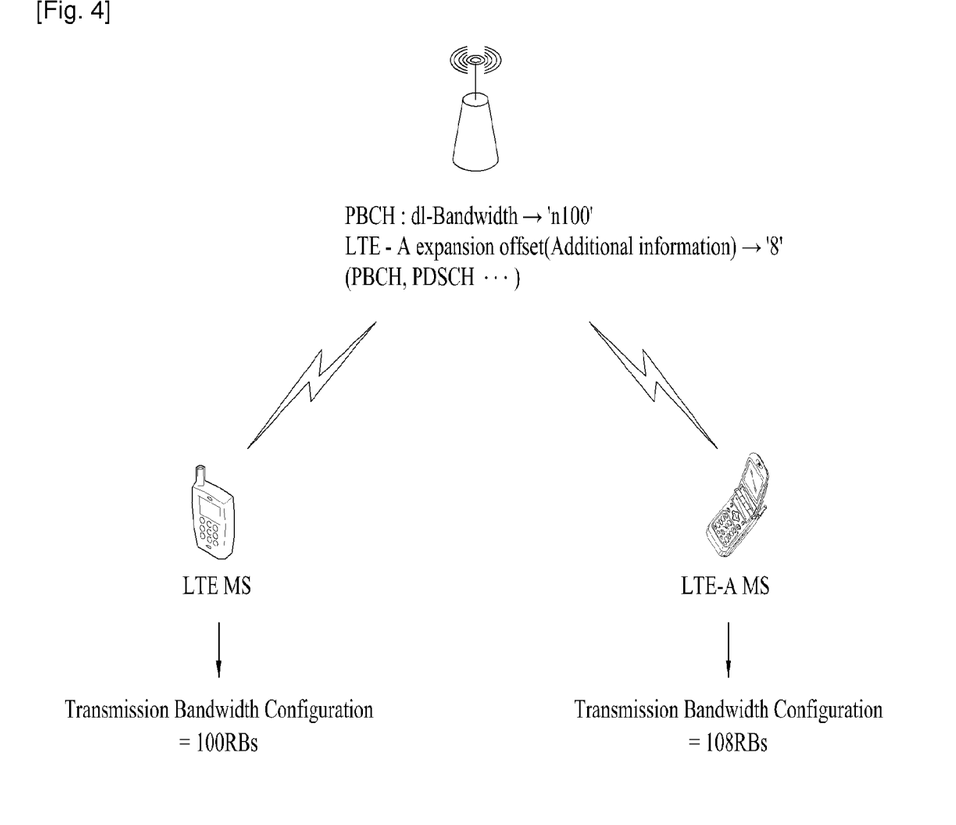
FIG. 4 is a diagram for a method of transmitting channel bandwidth information according to an embodiment of the present invention.

FIG. 4 is a diagram for a method of transmitting channel bandwidth information according to an embodiment of the present invention.

Referring to FIG. 4, a base station transmits the maximum number of transport blocks available for a mobile station supporting a legacy system on a corresponding channel according to a specification of the legacy system. For instance, in case that a bandwidth of each component carrier is 20 MHz, the maximum number of transport blocks available for a mobile station supporting LTE system is 100. Hence, a base station sets a value of a d1-bandwidth field of MIB of a physical broadcast channel (hereinafter abbreviated PBCH) to n100 according to the LTE specification and then transmits it to mobile stations within a cell.

The base station transmits information on the number of resource blocks additionally available for a mobile station supporting a new system as well as the transport blocks available for the mobile station supporting the legacy system. For instance, when a bandwidth of each component carrier is 20 MHz, if the maximum number of transport blocks available for a mobile station supporting LTE-A system is 108, the base station transmits information indicating that the number of additionally available resource blocks is 8. In this disclosure, the number of resource blocks additionally available for a mobile station supporting a new system is named an expansion offset.

The base station adds a field to the MIB or a system information block (hereinafter abbreviated SIB) carried on a physical downlink shared channel (hereinafter abbreviated PDSCH) and is then able to transmit information on the expansion offset via the added field.

Alternatively, the base station is able to transmit the information on the expansion offset via a radio resource control (hereinafter abbreviated RRC).

The number of bits required for transmitting the information on the expansion offset depends on the number of the expansion offsets supported by a wireless communication system. For instance, in case that a system bandwidth of a component carrier is 20 MHz, if the number of available transport blocks supported by the LTE-A system is 100 or 108, the information on the expansion offset can be indicated using 1 bit. If the number of the available transport blocks is one of 100, 102, 104, 106, 108 and 110, the information on the expansion offset can be indicated using 3 bits.

Meanwhile, the information on the expansion offset can be indicated in various ways. For instance, the base station is able to signal the number of resource blocks added more in the LTE-A system rather than the LTE system. In particular, if the number of resource blocks available via 20 MHz in the LTE-A system is 108, while the number of resource blocks via 20 MHz in the LTE system is 100, the base station is able to signal 8 to a mobile station.

Moreover, the base station is able to signal the maximum number of resource blocks available for a new system to a mobile station using an index. For instance, if the maximum number of resource blocks available for the LTE-A system is 100, the mobile station signals 1. If the maximum number of resource blocks available for the LTE-A system is 108, the mobile station signals 2.

In FIG. 4, each of the legacy system supporting mobile station and the new system supporting mobile station decodes the PBCH to be aware of the maximum number of the transport blocks available for the legacy system supporting mobile station. And, the new system supporting mobile station is aware of the maximum number of the transport blocks available for the new system via the information on the expansion offset.

For instance, a mobile station supporting LTE system and a mobile station supporting LTE-A system can be aware that the maximum number of the transport blocks available for the LTE system supporting mobile station is 100. And, the LTE-A system supporting mobile station can be aware that the LTE-A system supporting mobile station is able to additionally use 8 transport blocks via the expansion offset.

If so, the LTE system supporting mobile station transceives data using maximum 100 resource blocks. And, in case of receiving the information on the expansion offset via PBCH, the LTE-A system supporting mobile station transceives data using maximum 108 resource blocks right after reception of the PBCH. In case of receiving the information on the expansion offset via PDSCH, the LTE-A system supporting mobile station transceives data using maximum 100 resource blocks until receiving the PDSCH but transceives data using 108 resource blocks after receiving the PDSCH.

According to the embodiment of the present invention, the example is based on that a bandwidth of the component carrier is 20 MHz. Yet, the present invention is applicable to a case that the bandwidth of the component carrier is not 20 MHz as well.

Information on a channel bandwidth can be transmitted per component carrier. And, channel bandwidth information on all of a plurality of component carriers can be transmitted via a representative component carrier among a plurality of the component carriers. Thus, the present invention is applicable to both of the information transmissions.

Unlike the above mentioned description, the present invention is applicable to a case that configuration information of all CC is carried on a single representative CC among a plurality of CCs in applying CA.

Figure 5:
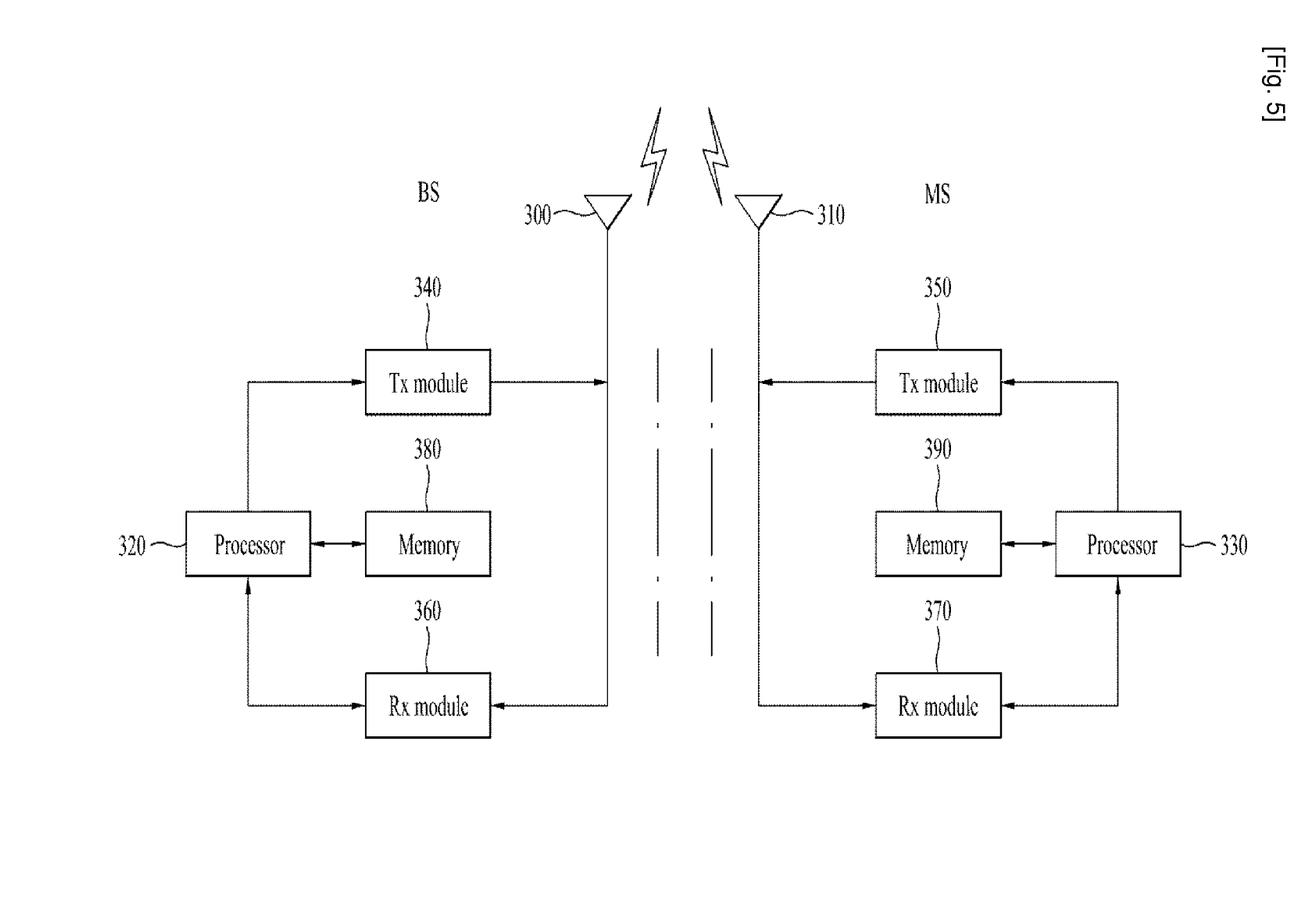
FIG. 5 is a diagram for configurations of mobile and base stations, in which embodiments of the present invention are implemented.

FIG. 5 is a diagram for configurations of mobile and base stations, in which embodiments of the present invention are implemented.

Referring to FIG. 5, a mobile station (AMS)/base station (ABS) includes an antenna 500/510 capable of transmitting and receiving information, data, signals and/or messages and the like, a transmitting module (Tx module) 540/550 transmitting a message by controlling the antenna, a receiving module (Rx module) 560/570 receiving a message by controlling the antenna 500/510, a memory 580/590 configured to store informations relevant to communications with a base station, and a processor 520/530 controlling the transmitting module, the receiving module and the memory. In this case, the base station can include a femto base station or a macro base station.

The antenna 500/510 externally transmits a signal generated from the transmitting module 540/550. And, the antenna 500/510 receives a radio signal from outside and then delivers the received radio signal to the receiving module 560/570. In case that a multiple-antenna (MIMO) function is supported, at least two antennas can be provided to the mobile station or the base station.

The processor 520/530 generally controls overall operations of the mobile/base station. In particular, the processor 520/530 is able to perform a control function for performing the above-described embodiments of the present invention, a MAC (medium access control) frame variable control function according to service characteristics and propagation environment, a handover function, an authentication function, an encryption function and the like. And, the processor 520/530 can further include an encryption module configured to encrypt various messages and a timer module configured to control transmission and reception of the various messages.

The transmitting module 540/550 performs prescribed coding and modulation on a signal and/or data, which is scheduled by the processor and will be then transmitted externally, and is then able to deliver the coded and modulated signal and/or data to the antenna 500/510.

The receiving module 560/570 reconstructs the radio signal received externally via the antenna 500/510 into original data in a manner of performing decoding and demodulation on the received radio signal and is then able to deliver the reconstructed original data to the processor 520/530.

The memory 580/590 can store programs for processing and control of the processor and is able to perform a function of temporarily storing input/output data (e.g., in case of the mobile station, UL grant allocated by the base station, system information, station identifier (STID), a flow identifier (FID), an action time, region allocation information, frame offset information, etc.).

And, the memory 580/590 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

The invention claimed is:

1. A method for transmitting signals by a base station in a wireless communication system supporting a carrier aggregation of a plurality of component carriers, the method comprising:
   transmitting first information indicating a maximum number of resource blocks available for a first type mobile station and a second type mobile station; and
   transmitting second information indicating an extended number of resource blocks available for the second type mobile station,
   wherein the first type mobile station does not support the carrier aggregation and the second type mobile station supports the carrier aggregation, and
   wherein, when a continuous aggregation of the plurality of component carriers is configured, the extended number of resource blocks include available resource blocks between each component carrier and a guard band of each component carrier.

2. The method of claim 1, wherein the extended number of resource blocks include the maximum number of resource blocks.

3. The method of claim 1, wherein the first information is transmitted via a master information block (MIB) carried on a physical broadcast channel (PBCH) and the second information are transmitted via a system information block (SIB) carried on a physical downlink shared channel (PDSCH).

4. The method of claim 1, wherein the first information and the second information are transmitted via a master information block (MIB) carried on a physical broadcast channel (PBCH).

5. The method of claim 1, wherein the second information is represented as an index.

6. A method for receiving signals by a mobile station in a wireless communication system supporting a carrier aggregation of a plurality of component carriers, the method comprising:
  receiving first information indicating a maximum number of resource blocks available for a first type operation mode and a second type operation mode; and
  receiving second information indicating an extended number of resource blocks available for the second type operation mode,
  wherein the first type operation mode does not support the carrier aggregation and the second type operation mode supports the carrier aggregation, and
  wherein, when a continuous aggregation of the plurality of component carriers is configured, the extended number of resource blocks include available resource blocks between each component carrier and a guard band of each component carrier.

7. The method of claim 6, wherein the extended number of resource blocks include the maximum number of resource blocks.

8. The method of claim 6, further comprising:
  transceiving data with the base station using resource blocks indicated by the first and second information.

9. The method of claim 6, wherein the first information is transmitted via a master information block (MIB) carried on a physical broadcast channel (PBCH) and the second information are received via a system information block (SIB) carried on a physical downlink shared channel (PDSCH).

10. The method of claim 6, wherein the first information and the second information are received via a master information block (MIB) carried on a physical broadcast channel (PBCH).

11. A base station in a wireless communication system supporting a carrier aggregation of a plurality of component carriers, the base station comprising:
  a transmitting module; and
  a processor configured to:
    control the transmitting module to transmit first information indicating a maximum number of resource blocks available for a first type mobile station and a second type mobile station; and
    control the transmitting module to transmit second information indicating an extended number of resource blocks available for the second type mobile station,
    wherein the first type mobile station does not support the carrier aggregation and the second type mobile station supports the carrier aggregation, and
  wherein, when a continuous aggregation of the plurality of component carriers is configured, the extended number of resource blocks include available resource blocks between each component carrier and a guard band of each component carrier.

12. The base station of claim 11, wherein the extended number of resource blocks include the maximum number of resource blocks.

13. A mobile station in a wireless communication system supporting a carrier aggregation of a plurality of component carriers, the mobile station comprising:
  a receiving module; and
  a processor configured to:
    control the receiving module to receive first information indicating a maximum number of resource blocks available for a first type operation mode and a second type operation mode; and
    control the receiving module to receive second information indicating an extended number of resource blocks available for the second type operation mode,
  wherein the first type operation mode does not support the carrier aggregation and the second type operation mode supports the carrier aggregation, and
  wherein, when a continuous aggregation of the plurality of component carriers is configured, the extended number of resource blocks include available resource blocks between each component carrier and a guard band of each component carrier.

14. The mobile station of claim 13, further comprising a transmitting module,
  wherein the processor is further configured to control the receiving and transmitting modules to transceive data with the base station using resource blocks indicated by the first and second information.

15. The base station of claim 11, wherein the first information is transmitted via a master information block (MIB) carried on a physical broadcast channel (PBCH) and the second information is transmitted via a system information block (SIB) carried on a physical downlink shared channel (PDSCH).

16. The base station of claim 11, wherein the first information and the second information are transmitted via a master information block (MIB) carried on a physical broadcast channel (PBCH).

17. The base station of claim 11, wherein the second information is represented as an index.

18. The mobile station of claim 13, wherein the extended number of resource blocks include the maximum number of resource blocks.

19. The mobile station of claim 13, wherein the first information is transmitted via a master information block (MIB) carried on a physical broadcast channel (PBCH) and the second information is received via a system information block (SIB) carried on a physical downlink shared channel (PDSCH).

20. The mobile station of claim 13, wherein the first information and the second information are received via a master information block (MIB) carried on a physical broadcast channel (PBCH).

* * * * *